Nov. 21, 1961  H. J. LEONARD, JR  3,009,167
PLUMBING ADAPTER PLATE
Filed Oct. 12, 1959
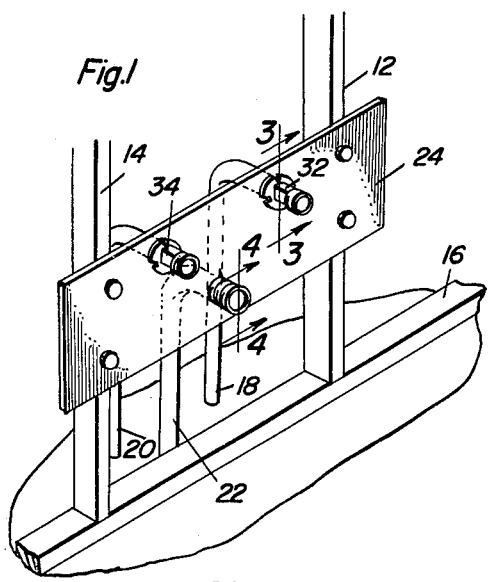
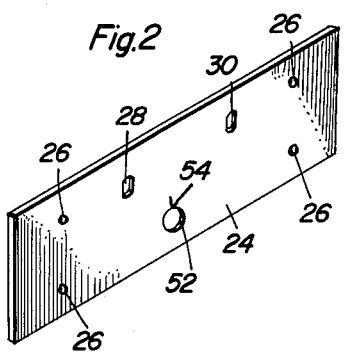
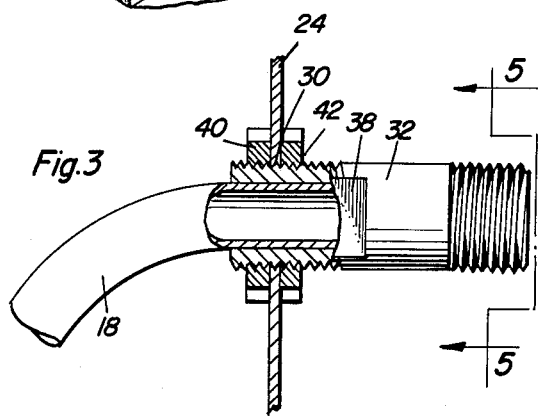
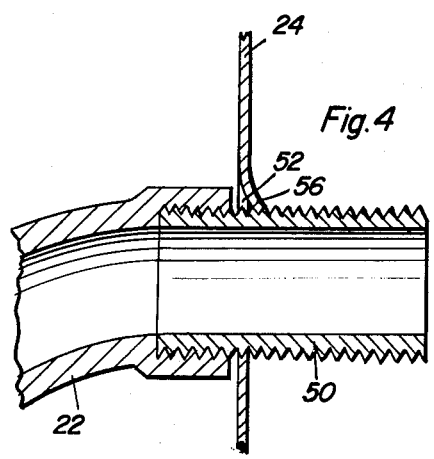
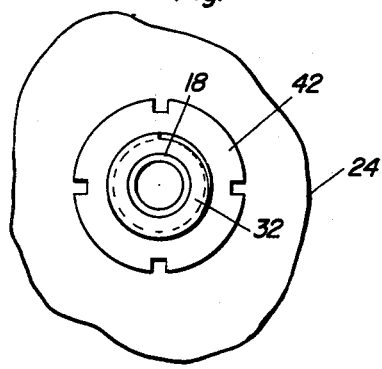
Harry J. Leonard, Jr.
INVENTOR.

United States Patent Office 3,009,167
Patented Nov. 21, 1961

3,009,167
PLUMBING ADAPTER PLATE
Harry J. Leonard, Jr., P.O. Box 83, Port Hope, Mich.
Filed Oct. 12, 1959, Ser. No. 845,836
1 Claim. (Cl. 4—191)

This invention relates to devices for facilitating the installation of plumbing and more particularly to the plumbing of lavatories.

The principal object of the invention is to provide a new, improved and much more economical method for plumbing lavatories by the use of an adapter plate which locates the hot water, cold water and waste water lines in a precise position and very easily during the plumbing job.

Briefly, the invention is embodied in a plumbing adapter plate furnished either with or without certain fittings. The adapter plate has apertures at the correct location for the fittings so that upon installation the fittings, when used, are precisely located.

A very important feature of the invention is that the adapter plate is very easy to use, simply fitting against and nailed or otherwise fastened to studs, lathing, etc. in the wall adjacent to the fixture location.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the adapter plate, this view showing the adapter plate fastened to a pair of studs and having the lines connected therewith as they would appear during the plumbing job.

FIGURE 2 is a perspective view of the adapter plate.

FIGURE 3 is a sectional view on an enlarged scale and taken on the line 3—3 of FIGURE 1.

FIGURE 4 is a sectional view on an enlarged scale and taken on the line 4—4 of FIGURE 1.

FIGURE 5 is an end view showing one of the fittings and taken approximately on the line 5—5 of FIGURE 3.

In the accompanying drawings two studs 12 and 14 are shown connected to a plate 16. This is a typical, conventional type of wall construction ordinarily found in building construction. The studs are used as the structure support for hot and cold water plumbing lines 18 and 20, and waste line 22. One of the time consuming tasks in installing plumbing fixtures, for instance a bathtub, is obtaining the correct location of the lines 18, 20 and 22 and supporting them firmly for subsequent attachment of the fixtures that are used with the lines at the ends thereof.

Adapter plate 24 materially facilitates this task and is made of a flat metal rectangular panel having nail holes 26 therein spaced on 16 inch centers which is conventional for studs. It is understood that the invention contemplates a series of holes 26 to account for any irregularities that may exist in stud spacing and to enable the adapter plate to be fastened to structural supports other than studs, although the most common use is illustrated in FIGURE 1.

There are two apertures 28 and 30 in the adapter plate adjacent to one edge thereof and spaced from the ends. Each aperture is made with at least one flat side and preferably made with two opposed plates or flat sides to receive special fittings 32 and 34 which extend therethrough. The fittings are identical, and they are either soldered or otherwise secured to the ends of lines 18 and 20 protruding forward as an extension thereof. Consequently, each fitting, for instance fitting 32 in FIGURE 3, is made of a nipple having an externally threaded inner end and an externally threaded outer end, although it is within the contemplation of the invention to have the threads occupy more of the external surface than is shown in FIGURE 3 or to occupy less of the area. Standard wall covering thicknesses though, are such as to enable one adapter fitting such as at 32, to suffice for all normal installations. The nipple 32 has flat surfaces or flats 38 along diametrically opposite sides thereof, and these fit flush against the flat sides of aperture 30 preventing said nipple from turning once it is inserted in its aperture 30. Lock nuts 40 and 42 are provided on the innermost threaded part of the fitting, and these lock nuts bear against the front and rear surfaces of the adapter plate 24, holding the fitting firmly fastened in place. As shown in FIGURE 3 of the drawing, the threaded length of the nipple 32 exceeds the combined thicknesses of the plate 24 and the nuts 40 and 42. The lock nuts can be tightened in any way, for instance they may be especially designed to accept a spanner wrench.

Fitting 50 is different from fittings 32 and 34, and its use is in conjunction with the waste line 22. Most hot and cold water lines, today, are made of copper so that fittings 32 and 34 may be easily soldered in place. However, most waste lines are made of galvanized or black iron, and therefore fitting 50 is simply a nipple adapted to thread into the internally threaded end of line 22.

Aperture 52 is preferably longitudinally centered in adapter plate 24, and it is essentially circular. However, a slit 54 in plate 24 adjoins the side wall of aperture 32 so that when the fitting 50 is threaded into aperture 52, two small tabs 56 will automatically bend on opposite sides of slit 54 thereby forming a lock for the fitting 50 and holding it in place.

It is quite evident that a very substantial holding of the lines results from use of the adapter plate and fittings, and there is no problem of correct spacing and location of the lines.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An adapter to facilitate installation of water lines, said adapter comprising a plate for mounting on a support, said plate having an opening therein, a threaded nipple mounted in the opening for connection to a water line, means for securing the nipple in the opening, and means for positively securing said nipple against rotation in the opening, the first-named means including nuts threaded on the nipple and engaged with the opposite sides of the plate, the threaded length of the nipple exceeding the combined thicknesses of the plate and nuts whereby said nipple is longitudinally adjustable in said opening.

References Cited in the file of this patent
UNITED STATES PATENTS

| | | |
|---|---|---|
| 2,180,545 | Parsons et al. | Nov. 21, 1939 |
| 2,295,888 | Bucknell et al. | Sept. 15, 1942 |
| 2,434,844 | Flora | Jan. 20, 1948 |
| 2,628,799 | Aaby | Feb. 17, 1953 |
| 2,661,483 | Tortorice | Dec. 8, 1953 |
| 2,773,708 | Beyerle | Dec. 11, 1956 |